United States Patent [19]
Storch et al.

[11] Patent Number: 5,088,093
[45] Date of Patent: Feb. 11, 1992

[54] SELF-CORRECTING REGISTERS, ERROR-DETECTING/CORRECTING REGISTERS, AND INVERSION CODING USING ONE BIT, AND OTHER INFORMATION STORAGE MEDIA

[75] Inventors: Leonard Storch; Ernst van Haagen, both of New York, N.Y.

[73] Assignee: CIAS, Inc., New York, N.Y.

[21] Appl. No.: 109,075

[22] Filed: Oct. 16, 1987

Related U.S. Application Data

[63] Continuation-in-part of Ser. No. 853,745, Apr. 18, 1986, Pat. No. 4,814,589.

[51] Int. Cl.$^5$ ............................................. H03M 13/00
[52] U.S. Cl. ...................................... 371/30; 365/200; 371/37.1; 377/28
[58] Field of Search .................. 377/28, 30; 365/200, 365/190, 222; 371/30, 37, 49, 51, 37.7, 49.1, 51.1; 455/63, 67; 307/442, 491; 341/8, 93, 94

[56] References Cited

U.S. PATENT DOCUMENTS

| | | | |
|---|---|---|---|
| 3,109,990 | 11/1963 | Shuba | 377/28 |
| 3,421,148 | 1/1969 | Howells et al. | 365/200 |
| 3,768,071 | 10/1973 | Knauft et al. | 371/51 |
| 4,133,044 | 1/1979 | Gariazzo et al. | 377/30 |

*Primary Examiner*—Geoffrey S. Evans
*Attorney, Agent, or Firm*—Rosen, Dainow & Jacobs

[57] ABSTRACT

Registers are inclined to react to any interference as follows: if any one stage inverts, the entire register inverts. In one embodiment, one additional bit is associated with the register, which bit is used to indicate that interference has occurred. Registers may then be inverted to their original form or may, by equating the meaning of the inverted form of the information contents of registers to the original form, ignore disturbance(s) caused by interference. Information media such as magnetic or optical discs for storage of such information thereon are also disclosed. The invention brings order to information failures caused by interference and thus is able to use such failures as opposed to other approaches which fight such failures. The invention avoids the need to keep track of original and inverted forms of information, independent of interference.

16 Claims, 4 Drawing Sheets

Figure 4

| Decimal Information | | Register with Binary Equivalent | | Register with Binary Inverse | | Decimal Equivalent |
|---|---|---|---|---|---|---|
| | = | Original Form | > INVERTED TO > | Inverted Form | = | |

| Decimal | Original Form (extra / bit) | | Inverted Form (extra / bit) | Decimal |
|---|---|---|---|---|
| 0. | 0 0 0 0 0 0 0 0 0 / 1 1 1 1 1 1 1 1 1 | = | 1 1 1 1 1 1 1 1 1 / 0 0 0 0 0 0 0 0 0 | 511 |
| 1. | 0 0 0 0 0 0 0 0 1 / 1 1 1 1 1 1 1 1 0 | = | 1 1 1 1 1 1 1 1 0 / 0 0 0 0 0 0 0 0 1 | 510. |
| 2. | 0 0 0 0 0 0 0 1 0 / 1 1 1 1 1 1 1 0 1 | = | 1 1 1 1 1 1 1 0 1 / 0 0 0 0 0 0 0 1 0 | 509. |
| 3. | 0 0 0 0 0 0 0 1 1 / 1 1 1 1 1 1 1 0 0 | = | 1 1 1 1 1 1 1 0 0 / 0 0 0 0 0 0 0 1 1 | 508. |
| ... | | = | | ... |
| 254. | 0 1 1 1 1 1 1 1 0 / 1 0 0 0 0 0 0 0 1 | = | 1 0 0 0 0 0 0 0 1 / 0 1 1 1 1 1 1 1 0 | 257. |
| 255. | 0 1 1 1 1 1 1 1 1 / 1 0 0 0 0 0 0 0 0 | = | 1 0 0 0 0 0 0 0 0 / 0 1 1 1 1 1 1 1 1 | 256. |

Figure 4

SELF-CORRECTING REGISTERS, ERROR-DETECTING/CORRECTING REGISTERS, AND INVERSION CODING USING ONE BIT, AND OTHER INFORMATION STORAGE MEDIA

This application is a continuation-in-part of application Ser. No. 853,745, filed Apr. 18, 1986, titled "Information, Transfer and Use, Particularly With Respect To Objects Such As Gambling Chips".

BACKGROUND OF THE INVENTION

The present invention relates generally to data processing and media, and error tolerance, detection and correcting, particularly to interference error tolerance and detecting/correcting coding, circuits, systems and methods, particularly for digital information and apparatus.

The contents, and hence the meaning of the information in binary circuits such as registers may be changed by interference from sources such as lightning, radio interference, radar, cosmic rays, sun spots, static, noise, dirty lines, defective components, explosions, security systems, vibrators, ignition systems, compressors, etc. Interference may be thought of as causing any unwanted change to information or any change to information not in response to an instruction to change, and includes so-called soft errors. For example, the effect of interference may be to seemingly randomly invert one or more stages (binary digits or bits) of registers. Interference can thus render the contents of such circuits used, for example, in computers useless. Eliminating such interference may be difficult or impossible.

Heretofore error techniques have in effect sought to resist interference and detect and correct errors resulting from interference. Common parity, for example, is a well known technique for detecting errors per se. However, parity can only detect some errors, such as one-bit errors, and parity does not itself correct errors. Moreover, error correcting coding requires more than one extra bit or digit per byte, such as twice as many digits, which dramatically reduces the information capacity that the circuit may otherwise have, and can function reliably only if the extent of interference falls within precisely defined parameters.

There is thus a need for improved techniques, circuits, media, coding and methods for coping with errors caused by interference.

OBJECTS AND SUMMARY OF THE INVENTION

An object of the present invention is to improve the error tolerance of processes or methods, apparatus and/or coding so that, for example, digital devices such as registers are more tolerant of interference.

Another object of the present invention is to correct errors caused by interference, particularly in binary circuits and digital systems such as computers.

Another object of the present invention concerns avoiding the common requirement to keep track of the contents of binary circuits, such as registers in a computer, with respect to whether or not the contents are inverted, or of inversions while processing.

According to the present invention, order is brought to error-related failure caused by interference, and errors caused by interference are tolerated, and need not be corrected per se, or else they may be corrected. While the invention is not comparable to common parity, it is more helpful than even such parity in some circumstances, and, in one of its aspects, like parity, utilizes only one extra bit. The present invention provides processes or methods, and apparatus to use the encoded contents of, for example, registers and the like, despite changes in the information content thereof from interference, and processes or methods and apparatus for automatically restoring the proper encoded contents in registers after one or more interferences have occurred, assuming such registers were still operable. While use of the invention is preferred associated with registers and the like, of, for example, computers, it is transparent to application programmers (except for software routines that may be associated with the invention) and users, given automatically-run (in the event of disturbing interference) software routines that may be associated with the invention.

The term "register" or "registers" is used herein in a broad sense and encompasses, for example, devices registering or holding information such as a number or quantity, or signals representing same, and devices for storing data (see, for example, "Webster's Ninth Collegiate Dictionary", Merriam-Webster, 1984, page 992).

In accordance with the invention, binary circuits such as registers are constructed to, in the event of interference(s), be inclined to act as follows: if one or more binary digits in the circuit inverts, all binary digits of the register effectively invert, as many times as any one digit may be inverted by interference. Information contained in such circuits may be encoded in accord with coding techniques of the present invention, and the binary circuits are provided with one additional digit capacity to accommodate and implement such coding. For example, encoded information may comprise only one half of the possible information capacity of the circuit, thus allowing the inverted form of any of the encoded information to be readily equated to or readily restored to the original (non-inverted) form by using associated appropriate provisions such as may be provided by software. Use of such inversion and coding eliminates the need to keep track of the contents of binary circuits such as registers in computers with respect to inversion errors caused by interference.

This is accomplished by equating the meaning of the original form and the inverted form of information and using, storing, etc., either form as if they were interchangeable. This requires an extra stage (the additional capacity of one binary digit) in circuits such as registers or an extra storage location in media such as magnetic or optical discs in, for example, a computer, to maintain the same information capacity. Or, the contents may readily be restored (inverted) to their original form automatically at some selected point.

In accord with the present invention, the (binary) connotation associated with the properties of the digits may in effect be made interchangeable.

According to the invention, a circuit is provided having at least two outputs each of which may assume a number of states corresponding to the base of a number system, given combinations of the states and the outputs providing given information. The circuit is capable of providing information with the same meaning at its outputs regardless of changes of state at any of the outputs caused by interference which may affect the circuit. The states of the outputs of the circuit are interpretable to provide the same information for a given combination of states and for a related combination of states in which the states of corresponding outputs of the combinations are different but related. The construction of the circuit is such that when a change of state in any of the outputs or a change in the circuit which may produce an unwanted change of state in any of the outputs occurs, the states of all of the outputs are changed from the given combination to the related combination.

The circuit is preferably a binary circuit. According to that embodiment of the invention, the at least two outputs of the circuit each may assume each of two binary states, and the binary circuit is capable of providing the same information at its outputs regardless of changes of state at any of the outputs caused by interference. The states of the outputs of the binary circuit are interpretable to provide the same information for an original combination of states and for an inverted combination of states in which the states of corresponding outputs of the combinations are inverted.

The binary circuit may be a register having two or more locations which may act as outputs to define the information content of the register. The locations represent n binary digits, n being equal to two or more, and each of the locations is capable of assuming each of two binary states. The construction of the register is such that when the binary state of any one of the locations is or may be inverted by interference, the binary states of all of the locations are inverted. The binary states of the outputs before the interference define original information of the register and the states of the outputs after the interference define inverted information of the register that is inverted digit for corresponding digit from the original information. According to one embodiment, the register construction comprises a common coupling of points associated with each of the locations, each of the points being situated such that the condition of the points affects the state of a respective location. The register in another embodiment includes means (e.g., conductive material) coupled to the points for causing the states of the locations to invert when any of the states of the locations inverts from interference. The register may include open loop means associated with the points which is affected more by the interference than structure associated with other points, the means initiating a change of state of the one location when affected beyond a predetermined threshold.

According to another embodiment, the register includes means for detecting an inversion of the state of any of the locations from interference and means for causing the states of the locations to invert when the state of any one of the locations is inverted by interference. In a specific embodiment, the register includes means (e.g., a detector) for detecting an inversion of the state of any of the locations from the interference and means (e.g., a pulse generator) for causing the state of all of the locations to invert in response to detection of the inversion from the interference. The detecting means may be coupled to the locations to detect a change of state thereat. The register preferably includes means for inhibiting the causing means during predetermined operations of the register. In this embodiment, detection and inversion form a closed loop system.

In another embodiment, the register includes means (e.g., a delay or gate) for re-inverting the states of all of the locations to define again the original information subsequent to the interference, and subsequent to the initial inversion of the states of all of the locations. After the initial inversion of the states of all locations, the inverting means may automatically re-invert the states of the locations to again define the original information.

The invention also provides a code comprising a number of elements which define a given amount of information to be carried by the code plus at least one additional code element. Each element of the code is capable of assuming one of at least two contrasting properties, the number of contrasting properties being indicative of the base of a number system. A given combination of contrasting properties for the code elements is interpreted to provide given information, and a related combination of contrasting properties for the code elements in which the contrasting properties of corresponding code elements are different is interpreted to provide the same information. Other interpretations of the given combination and the related combination are not used. The at least one additional code element thus enables the code to carry the given amount of information when the unused combinations are considered.

According to one embodiment, the code is binary and is utilized with a circuit such as a register having an information capacity of not greater than n minus 1 binary digit or digits. In this embodiment, the locations and the states thereof define the elements of the code, the code representing information i when the states of the outputs define the original information and when the states of the outputs define the inverted information, thereby according to the code, the same meaning of information is defined by the states of the outputs regardless of whether the states define original or inverted information. The circuit may include means for detecting the state of the location representing for example, the most significant digit of the binary digits, the inverting means being responsive to the detecting means to re-invert the states of the locations to again define the original information.

Binary or higher order coding is provided in accordance with the invention representing information i in which the coding comprises n digits to the base b, n being equal to two or more. Each digit is represented by one of b differing physical properties. The coding represents information i when the properties of the digits form an original combination of properties and digits and when the properties of the digits form a changed combination in which the properties representing digits are different so that either the original combination or the changed combination of the coding may be interpreted as meaning information i, wherein the information capacity of the coding is less than if the changed combination was interpreted to mean different information.

In the case of binary coding, the coding comprises n binary digits n being equal to two or more, each digit being represented by one of two differing physical properties defining two binary levels. The coding represents information i when levels of the binary digits are in an original combination or in an inverted combination thereof in which the binary levels of corresponding digits are inverted. The information i is interpretable from the original combination and from the inverted combination of the binary coding, so that either the original combination or the inverted combination of the binary coding may be interpreted as meaning information i. The information capacity of the coding is not greater than n minus 1 binary digit or digits or, stated another way, the information capacity of the coding is not greater than half of b raised to the power of n.

The invention also provides a binary coding system for processing, computing, or otherwise operating on or storing binary information comprising a plurality of binary circuits, each of the circuits including one more output than the number of outputs required to provide a desired information capacity interpreted according to conventional binary notations, all of the outputs being required to provide the desired information capacity, the binary states of the outputs being interpretable to provide the same information for an original combination of the states and for an inverted combination of the states in which the states of corresponding outputs are inverted digit for corresponding digit, wherein the system does not have different meanings for information combinations which are inverted from each other. Each of the binary circuits has at least two outputs each of which may assume two binary states.

The invention also provides a method of making the information provided by a circuit having at least two outputs, each of which may assume a number of states corresponding to the base of a number system, tolerant to changes of state at any of the outputs caused by interference. The method comprises providing at least one of the outputs to the circuit so as to increase the information capacity of the circuit; interpreting the states of the outputs of the circuit to provide the same information for a given combination of states and for a related combination of states in which the states of corresponding outputs of the combinations are different; and changing the states of all of the outputs from the given combination to the related combination when the state of at least one of the outputs is changed by interference or a change resulting from interference is detected which is capable of causing the change of state.

The method is applicable to a binary circuit having at least two outputs each of which may assume two binary states. The method comprises providing one of the outputs to the circuit so as to increase the information capacity of the circuit by one binary digit; interpreting the states of the outputs of the circuit to provide the same information for an original combination of states and for an inverted combination of states in which the states of corresponding outputs of the combinations are inverted, and not providing a different binary interpretation of the states of one of the combinations; and inverting the binary states of all of the outputs from the original combination to the inverted combination when the state of at least one of the outputs is inverted by interference or a change is detected in the circuit resulting from the interference which may cause the at least one of the outputs to invert. The method may also include inverting the binary states of all of the outputs again back to the original combination.

BRIEF DESCRIPTION OF THE DRAWINGS

The present invention is illustrated by way of example and not limitation in the figures of the accompanying drawings in which like references refer to like parts and in which:

FIG. 4 is a table schematically illustrating the information content of registers interpreted in accordance with the coding of the present invention which, for example, equates the meaning of inverted forms of binary coded information.

DESCRIPTION OF THE PREFERRED EMBODIMENTS

Although the present invention is described below in connection with interference on the one hand and, for example, registers such as those in computers on the other, and is also described in connection with the heretofore need to keep track of information with respect to the inverted form and the original form, and is also described in association with coding and media therefor, it will be apparent to those skilled in the art that the invention has wider application and other uses.

Lightning or large explosion, for example, may create interference such as electromagnetic pulses that can disrupt electronic devices such as registers in a computer. Such, or other forms of interference, may physically damage some devices and the present invention does not address damage prevention or repairs required from such damage. However, in cases where interference does not cause physical damage to, for example, registers, but rather, the interference merely changes the contents of registers, by causing one or more binary digits to change (invert) one or more times, the present teachings can be utilized to support or tolerate such interference, or detect and correct for such interference. In accordance with one aspect of the invention, the contents of registers may continue to be used despite disturbing interference, and changes in the information content of registers resulting from interference are tolerated.

Figure 1:
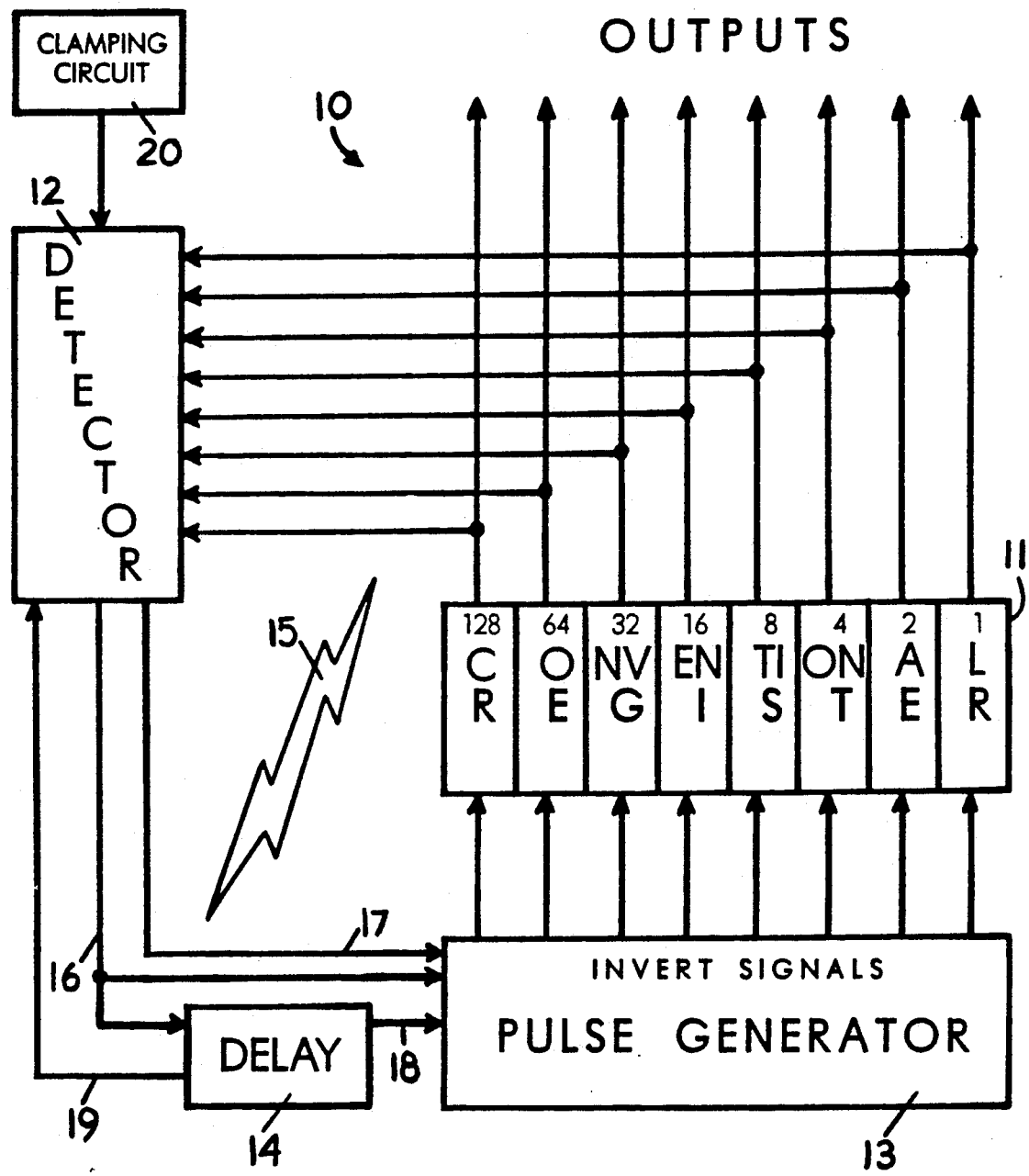
FIG. 1 is a block diagram of one embodiment of a register according to the present invention, which may be called a self-correcting register.

Referring to FIG. 1, a register 10 is depicted which includes a conventional register 11, a detector 12, a pulse generator 13 and a delay 14. Register 10 self corrects for inversion errors caused by interference and may be referred to as a self-correcting register.

In a first embodiment, detector 12 is coupled to each output of each stage of conventional register 11 and has its outputs connected to pulse generator 13 and delay 14. If sufficient disturbance from interference 15 occurs, detector 12 detects an inversion of any one or more of the outputs of conventional register 11, and in response thereto provides a signal on line 16 to pulse generator 13 and delay 14. Pulse generator 13 in response to the signal on line 16 from detector 12 provides an invert signal to each stage of conventional register 11 to cause all the outputs of all stages to invert except the output of the stage(s) which was inverted by interference 15. Detector 12 identifies the stage(s) which was inverted by interference 15 and instructs pulse generator 13 (prior to pulse generator 13 receiving the signal on line 16) via a signal on line 17 not to provide an invert signal to that stage(s), interference 15 having saved that effort. For example, detector 12 outputs the signal on line 17 to cause pulse generator 13 to clamp its outputs to the stages of register 11 already inverted by interference 15 prior to detector 12 supplying the signal on line 16 to pulse generator 13. Detector 12 and pulse generator 13 may include logic circuitry for identifying the register stage(s) directly inverted by interference 15.

Thus, in response to interference 15, all stages of register 11 have been inverted once. Delay 14, having received the same signal from detector 12 as pulse generator 13, provides a second signal on line 18 to pulse generator 13, but after a delay so that all stages will have already been inverted once. In response to the signal on line 18 from delay 14, pulse generator 13 provides a second invert signal to each stage of register 11 to cause all stages to again invert, but this time no exceptions are made and all stages are inverted a second time. For example, delay 14 supplies a signal on line 19 to detector 12 which causes detector 12 to supply a signal on line 17 to pulse generator 13 causing pulse generator 13 to unclamp all of its outputs to register 11 subsequent to all stages of register 11 having been inverted once and prior to sending a signal on line 18 to pulse generator 13 to again invert all stages of register 11. Thus the information in register 11 is inverted to the form it was in before interference 15. With this circuit and timing, race conditions are not encountered. Other methods and circuits using less circuitry may be possible.

A summary of the sequence of operation of register 10 of FIG. 1, as described above, is as follows. Interference 15 occurs and inverts at least one stage of conventional register 11. Detector 12 detects the inversion of the at least one stage and supplies a pulse on line 17 to pulse generator 13 to cause pulse generator 13 to clamp each invert signal output coupled to a stage of register 11 that was inverted by the interference. Detector 12 then supplies a signal on line 16 to pulse generator 13 and delay 14. Delay 14 starts a first delay period in response to the signal received on line 16 and pulse generator 13 in response to the signal on line 16 outputs invert signals on all of its outputs which are not clamped. In response to the invert signals, which are supplied only to stages not already inverted by the interference, all stages of register 11 not inverted by the interference are inverted. Delay 14 then ends the first delay period and supplies a signal on line 19 to detector 12 and starts a second delay period. The signal received by detector 12 on line 19 causes detector 12 to supply a signal (or simply remove the previous signal) on line 17 which in turn causes pulse generator 13 to unclamp any of its clamped outputs. Delay 14 now ends the second delay period and outputs a signal on line 18 to pulse generator 13 to cause pulse generator 13 to output invert signals on all of its outputs, no exceptions, to register 11 which signals invert all stages of register 11. All stages of register 11 have now been inverted twice and register 11 has the same binary information as before the interference.

In a second embodiment, using circuitry similar to that depicted in FIG, 1, the stages of register 11 could be made to operate in "t" time so that they can only invert once in "t" time. Detector 12 and pulse generator 13 could be made to operate in sufficiently less than "t" time together, thus all stages of register 11 will be inverted once in response to interference 15. Detector 12 would not need to identify any particular stages and pulse generator 13 would send an invert signal to all stages of register 11 in response to interference 15. Delay 14 would operate as before to restore the original information in register 11 by causing all of the outputs of register 11 to invert again.

In a third embodiment, the stages of register 11 are made faster than detector 12 and pulse generator 13. Detector 12 flags the stage(s) that are inverted by interference 15, and pulse generator 13 inverts all stages of register 11, allowing the stage(s) that were inverted first by interference 15 to be inverted a second time. Subsequently, delay 14 inverts all stages back to their original form except that the flag(s) would control logic circuitry to not allow the stage(s) that was inverted from interference to invert again since it is already in its original form.

On occasion, it may be desirable to clamp detector 12 and/or pulse generator 13 and/or delay 14 under some circumstances, such as while the contents of conventional register 11 are being samples, augmented, used, loaded, unloaded or the like. For example, clamping circuit 20 could cause detector 12, etc., to be clamped during sampling and thus inhibited. Such detectors, pulse generators, delays and clamping circuits, may physically be part of the register 10 as depicted in FIG. 1, or otherwise associated therewith. This applies to other embodiments described below is well.

Register 10 depicted in FIG. 1 provides for closed loop connection of an inversion from interference. In an open loop embodiment, detector 12 is not connected to the outputs of the stages of conventional register 11, but is made more sensitive to interference than conventional register 11. As a result, detector 12 will detect all interference which may cause an inversion in a stage of register 11 and provide a signal to pulse generator 13 in response thereto. Pulse generator 13 will provide invert signals to all stages of conventional register 11 which would override the interference. Detector 12 and pulse generator 13 are made faster than conventional register 11 so that they will react to interference 15 before conventional register 11 could react. Delay 14 could operate as before to restore the original information in register 11 after inversion in response to interference 15.

The logic circuitry and circuitry for implementing detector 12, pulse generator 13, delay 14 and clamping circuit 20 will be known to those of skill in the art. Signals on lines 16, 17, 18 and 19 as well as the other signal lines depicted schematically in FIG. 1, may be comprised of more than one conductive path. This applies to the other figures and circuit elements as well.

Figure 2:
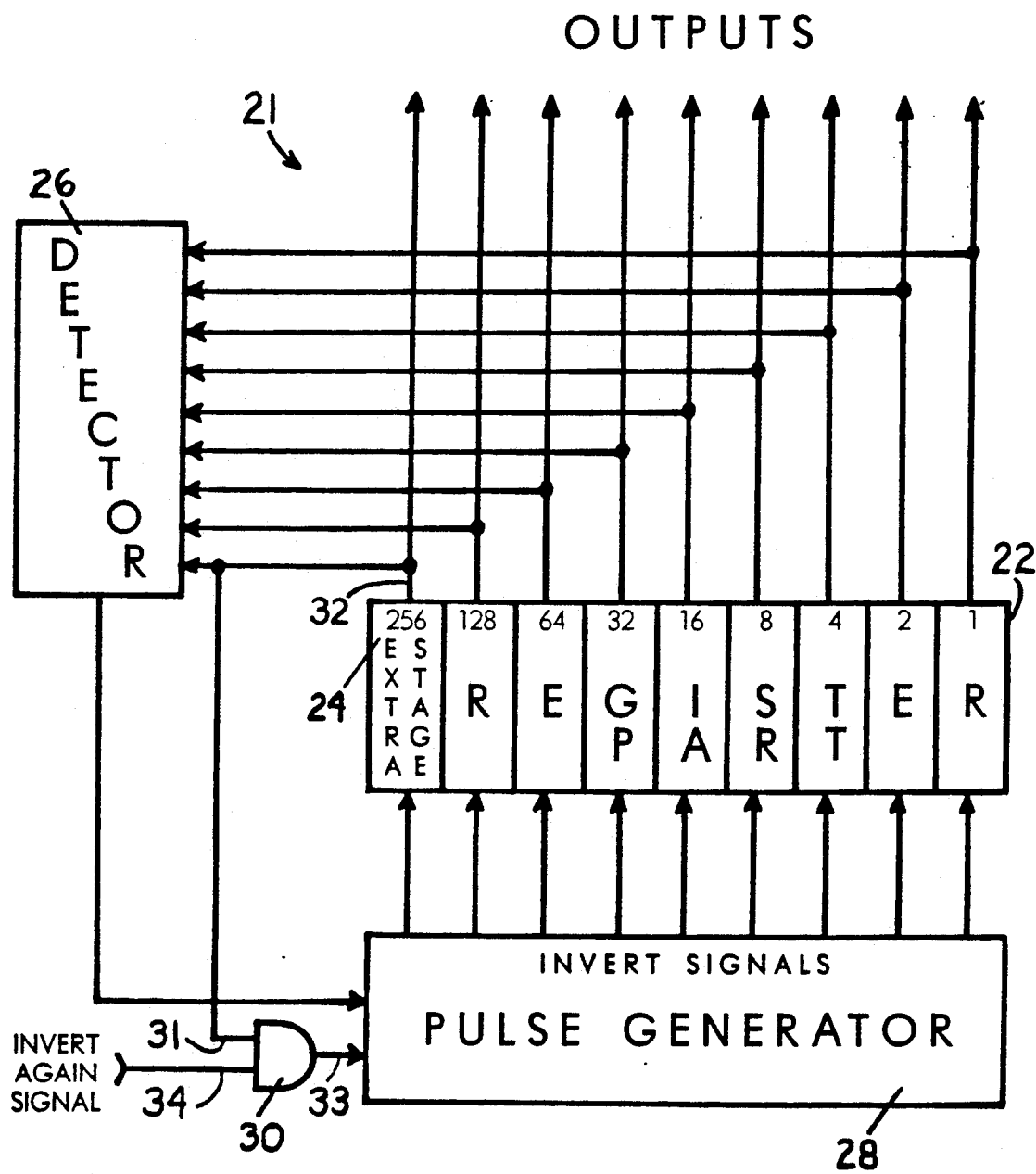
FIG. 2 is a block diagram of another embodiment of a register according to the present invention.

Referring to FIG. 2, register 21 includes a register part 22, detector 26 and pulse generator 28, which are respectively similar to register 11, detector 12 and pulse generator 13 in FIG. 1. Register part 22 includes the extra capacity of one binary digit corresponding to extra stage 24.

Register 21 may operate generally as described above for register 10 in the second embodiment thereof. Register 21 includes AND gate 30 (instead of a delay circuit) having one of its inputs 31 connected to the output 32 of extra stage 24 and its output 33 connected to pulse generator 28. AND gate 30 is provided to cause pulse generator 28 to provide a complete restoring set of invert signals to register part 22 if the output 32 of extra stage 24 has been previously inverted by interference and an "invert again" (re-invert) signal is received on the other input 34 of AND gate 30. Extra stage 24 indicates when all of the outputs of register part 22 have been inverted, and enables AND gate 30. When it is desired to re-invert register part 22 back to its original state, the above-mentioned invert again signal is supplied to input 34 of enabled AND gate 30 which passes that signal to pulse generator 28.

Figure 3:
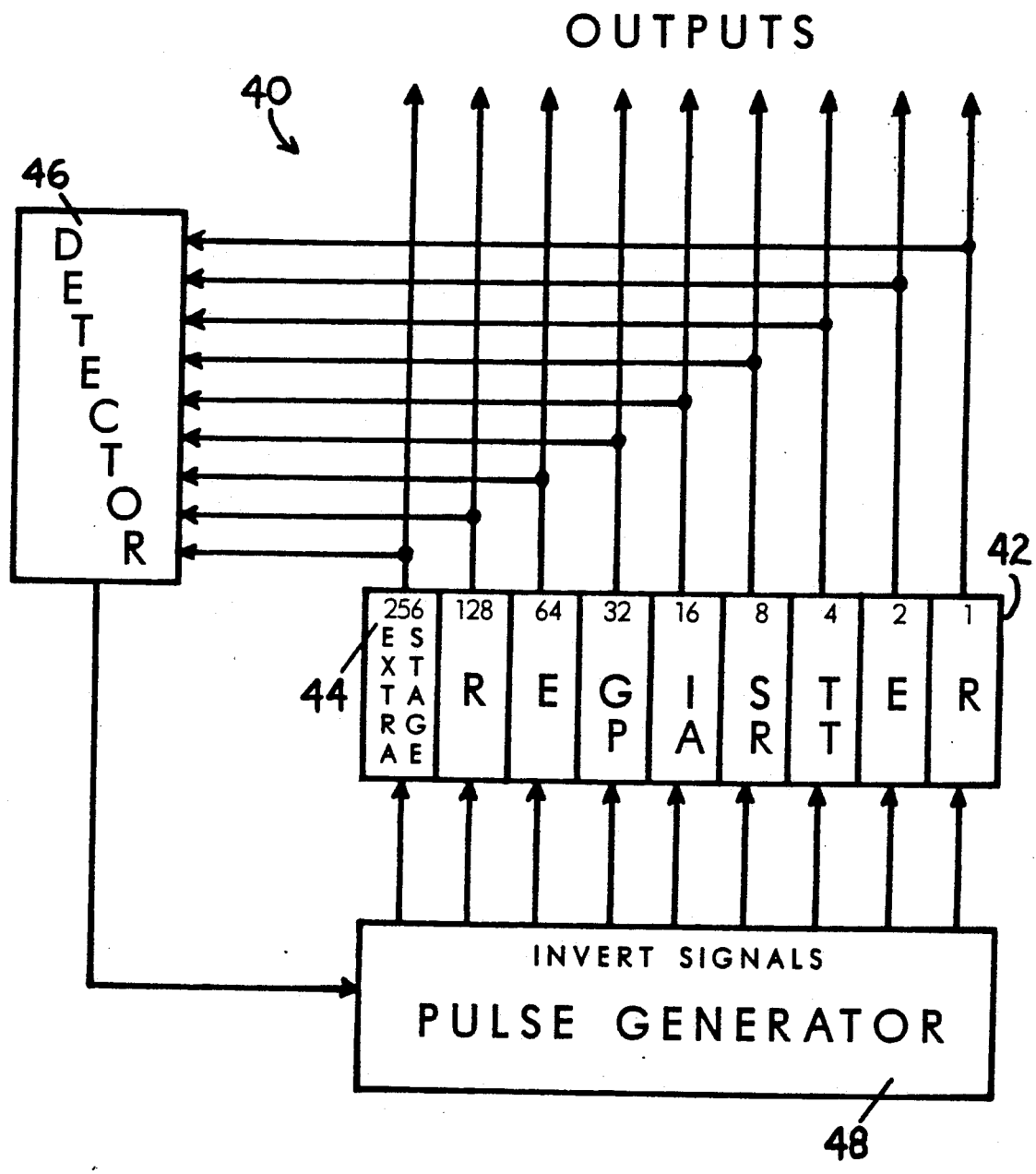
FIG. 3 is a block diagram of another embodiment of a register which utilizes the coding aspect of the present invention.

Referring to FIG. 3, register 40 includes a register part 42, detector 46, pulse generator 48 and extra stage 44, which are respectively similar to register part 22, detector 26, pulse generator 28 and extra stage 24 in FIG. 2, and operates generally as described for FIG. 2. But no means, such as AND gate 30 (or delay 14) for inverting back to the original form of the information in register 40 is required. The lack of need in this embodiment for inverting back to the original form is explained below in association with coding.

In another embodiment, the outputs of the stages of register part 42 of FIG. 3 are all caused to invert (not shown) when the output of any one stage is inverted by interference using less circuitry than in the embodiment of FIG. 3. Specifically, in that other embodiment, detector 46 and pulse generator 48 are not used. Instead, a sampling point or points in each of the stages of register part 42 e.g., outputs such as collectors, sources or comparable points of each stage, are sampled to detect if a change of state occurs due to interference. Such sampling may be implemented by, for example, a diode or capacitor coupled to each of the sampling points and directly or indirectly to, for example, the inputs of each stage of register part 42 to quickly couple the change in state of one stage to all stages. Alternatively, the diodes or capacitors may be coupled to, for example, a one-shot with a fast response time which outputs a pulse with a fast rise time, the one-shot in turn being coupled to the inputs of each of the stages of register part 42. In immediate response to the change of state, the one-shot outputs a pulse to the inputs of register part 42 and the leading edge of the pulse is used to invert all of the stages. Thus, the coupling of the diodes or capacitors, or the one-shot to the inputs of register part 42 causes the states of all stages to invert as if in unison when an inversion of the state of one or more stages is detected. Components and coupling thereof may have to be selected to avoid race condition problems that may allow interference 15 to invert any stage of register part 42 more than once in response thereto, rather than being inverted as if in unison by the components. Thus, in this other embodiment, if the state of any one or more stages inverts, the states of all stages invert.

The invention, in another of its aspects, may use alternative means which may be used alone or to augment other means (such as described with FIGS. 1, 2 or 3) to provide or help provide the quality described above of all stages being inverted in response to interference. Much of the disturbance from certain types of interference, such as electromagnetic pulses (EMP) from lightning or large explosions, is received by any conductive material and/or adjacent conductive material; the more material mass the more interference disturbance received. Considering, for example, typical semiconductor circuits that may comprise registers, the working junctions of such circuits are connected to leads or are adjacent to associated materials that are conductive, is well as being composed of conductive material themselves.

In this aspect of the invention, working junction(s) or other points of each digit's stage of the register are selected on the basis of their ability to invert the stage if an interference is received by them. Such points are connected or coupled together and the amount of the conductive material attached or coupled or adjacent to the thus connected or coupled selected points is increased so as to make their thus combined mass sufficiently large to receive more interference disturbance that other associated points of the stages so that the influence of the disturbance most readily causes each of these selected points to invert its respective stage in unison with the others. Thus, the interference is used, instead of being resisted, to invert all stages. Also, the increased material may be selected to enhance the desired effect (such as selecting semiconductor material doped with impurities that increase its conductive ability).

Various other combinations of the above could be employed to get the desired results. Interference tolerance, in accord with the descriptions above, and possibly in concert with the improved coding below, may thus be imparted to registers.

Referring again to FIG. 3, no means for inverting back to the original form of the information in register 40 is provided, and without such, a given interference, for example, affecting a given computer, for example, may affect any one of the many registers 40 which may be used in the given computer differently, so that, even with registers 40, after an interference(s) the meaning of the binary information contained in the various registers 40 cannot be interpreted because there is no way of telling which registers are (left) inverted from interference and which not. Of course, if a register 40 is inverted an even number of times in response to interference there may be no problem.

Be that however as it may, in accord with the present invention, by making the encoded contents of registers 40 readily interpretable (or readily restorable to the original condition as described above), despite having been inverted one or more times, or not having been inverted by interference, the given computer would be more tolerant to interference. The coding described below may be utilized to make the original form or the inverted form of the binary information of registers 40 of FIG. 3 readily interpretable.

Coding

Coding for the information put into registers 40 is chosen from the first half of the information possible, i.e., starting at zero, ascending and sequential. (This may be stated in other ways.) This is done by using a register with the larger capacity of one extra binary stage 44. For example, information that would normally fit in an 8 bit register would require an extra stage in the register, for a total of 9 stages in accord with the invention. The additional binary bit provided by the extra stage may physically be part of the register or otherwise associated with the register. In accord with the thus described coding of the invention, only the information from zero through 255 (one less than two raised to the power of eight) may be contained in register part 42; the ninth bit would thus normally be turned off, this being the original form of the extra stage 44. If the information in register part 42 were then inverted by interference, for example, the inverted information could be easily recognizable by thus having the ninth bit turned on (by the interference inversion), and readily identifiable and used as such or readily identified and inverted back to its normal form, as, for example, described in association with FIG. 2, with provision including software or signals being provided by those skilled in the art for said recognizing, identifying, using, and inverting purposes. The extra stage part 42 doubles the capacity of register 44 but only half the capacity is utilized because either the original form or the inverted form may be interpreted as meaning a given information i in register part 42.

In other words, each given information would have two coded representations: the original form and the inverted form, each having the same interpretable meaning. The meaning of each original form of information is equated with its respective inverted form. Either the original form or the inverted form may thus be processed equally well with the same result since both forms mean the same information. This coding technique equates the meaning of the original form and the inverted form of information contained in registers thus allowing the convenience of not needing to keep track of inversions, which has application regardless of whether interference is received.

The effect of thus equating the meaning of the original form and the inverted form of, for example, information i which is comprised of binary digits, is the same as if the connotation of the two properties associated with the binary digits 1 and 0 are interchangeable, i.e., if, say, +5 v were interpreted as binary 1 and 0 v interpreted as binary 0, and, using this combination for the connotations of the properties and digits, information i was interpreted, this being considered the original form of information i, and then the connotation of the properties and the digits was interchanged so that +5 v is interpreted as binary 0 and 0 v interpreted as binary 1, and, using this second combination for the connotations of the properties and digits, information i was interpreted, the inverted form of information i being obtained.

The present invention is also applicable to information media such as magnetic or optical storage devices, bar codes such as might be used on consumer foods and products sold, for example, in supermarkets, or paper money, casino chips, a Soft Strip, for example, printed on paper, etc. For example, the coded information contents of 640,000 registers 40 of FIG. 3 may be used, for example, in a desk top publishing system for holding information being processed and information for processing it. Such information, coded according to the description above associated with FIGS. 3 and 4, may be stored on and retrieved from information media such as a hard or floppy disc. Physically located on such a disk would be an extra storage location to store the information of extra stage 44 of register part 42, which location may be physically associated with storage locations for the remainder of the information in register part 42. Thus, coding for information could conveniently and readily be retrieved and stored from any storage media.

Referring to FIG. 4, decimal information 0 through 255 is schematically illustrated associated with the original form of its binary equivalent shown in a register. The coding described above equates the meanings of the informations to the inverted forms (equality being illustrated by the large equal signs) which are shown next to each original form, and the decimal equivalent of the inverted form is shown associated with the inverted form. Each inverted form and its decimal equivalent may be considered the complement of its respective original form. The complement of the contents of each original form register and each inverted from register illustrated is also depicted in each respective register in a lighter weight font. Each register illustrated shows an extra stage labeled "extra bit" as described for the coding above. In any case, FIG. 4 illustrates the equivalent meanings described above in association with the coding aspect of the present invention.

The two contrasting properties described above in relation to binary coding may include any two distinguishable properties arranged in patterns including properties that are related to each other such as two voltage levels or two gears or properties that are unrelated to each other such as different objects or such as time and energy.

Moreover, the invention herein may be applied to ternary coding, quartal (quaternary, base 4) coding, decimal coding, hexadecimal coding or coding of any base. Examples of ternary coding systems follow where, for example, the colors red, yellow and blue are used to represent the three digits 0, 1 and 2 (as may be done, for example, when applying the present invention to coded machine-readable colored markings or the like or any other information media):

A) the colors respectively represent the digits, i.e., red=0, yellow=1 and blue=2, without the use of the invention herein, or, with the benefit of the invention herein as illustrated in B and C;

B) the colors represent the digits with some order, such as:
  I) red, yellow and blue equaling 0, 1 and 2, respectively or;
  red, yellow and blue equaling 1, 2 and 0, respectively, or;
  III) red, yellow and blue equaling 2, 0 and 1, respectively;

C) the colors represent the digits with less order than B, such as:
  I) red, yellow and blue equaling 0, 1 and 2, respectively or;
  II) red, yellow and blue equaling 1, 2 and 0, respectively or;
  III) red, yellow and blue equaling 2, 0 and 1, respectively;
  or the following (reverse) orders:
  IV) red, yellow and blue equaling 0, 2 and 1, respectively or;
  V) red, yellow and blue equaling 2, 1 and 0, respectively, or;
  VI) red, yellow and blue equaling 1, 0 and 2, respectively.

Given the use of n ternary digits, the most information could be coded with system A and the least with system C.

In a quartal system, for example, wherein no order was required, there would be 4! (four factorial) or 24 possible ways of associating the four differing properties with the four places. In such a quartal coding system where, say five places were utilized, one could only realize 51 unique codes for information whereas in a quartal system utilizing five places normally one could realize 1024 unique codes, i.e., zero through (4 raised to the power of 5) minus one.

The disclosure herein including the illustrative examples presented will provide those skilled in the art with many uses for the invention, which may involve different embodiments or changes and modifications in the embodiments of the invention disclosed herein without departing from the spirit and scope of the teachings including the appended claims herein. For example, those interested in encoding secret information or providing encoded information that does not require specific knowledge aforehand as to the connotation of the properties of the digits comprising the information, or those interested in decoding such encoded information of others, or decoding unknown coding and/or information of others, may also find the present invention useful as such or integrated with other techniques. To those skilled in the art the present invention may be used as preferred or improved or simpler means of presenting coded information than binary (or otherwise) coded information because a reference for contrast such as polarity, light, dark, etc., is not used.

Associated with the invention, in some apparatus under some circumstances, may be the desire to effectively back up one or more steps after interference has occurred, for example, during samplings, and the invention may be incorporated in the operation of processors which may be associated with registers and information media described above. Also, certain aspects of the invention disclosed herein may readily by applied be those skilled in the art to signals, such as input and output signals, telecommunications, morse-type codes wherein dots and dashes have interchangeable connotation, etc. and any form of information media, and used as such or integrated with other techniques to, for example, in effect filter out undesired effects of some interference, etc.

What is claimed is:

1. A register having two or more locations which may act as outputs to define the information content of said register, said locations representing n binary digits, n being equal to two or more, each of said locations being capable of assuming each of two binary states, the construction of said register being such that when the binary state of any of said locations is inverted by interference, the binary states of all of said locations not already inverted by interference are inverted, the binary states of said locations before said interference defining original information of said register and the states of said locations after said interference defining inverted information of said register that is inverted digit for corresponding digit from said original information, and means for inverting the states of all of said locations to define again said original information subsequent to said interference, and subsequent to the states of all of said locations not already inverted by interference having previously been inverted in response to said interference.

2. The register according to claim 1 including means for causing the states of said locations not already inverted by interference to invert when the state of any of said locations is inverted by said interference.

3. The register according to claim 2 including means for inhibiting said causing means during predetermined operations of said register.

4. The register according to claim 1 wherein said register has an information capacity of not greater than n minus 1 binary digit or digits.

5. The register according to claim 1 including means for detecting an inversion of the state of any of said locations from said interference and means for causing the state of all of said locations not already inverted by interference to invert in response to detection of said inversion from said interference.

6. The register according to claim 1 including means coupled to said locations for detecting a change in state of any of said locations from interference.

7. The register according to claim 1 wherein said construction comprises a common coupling of circuit points associated with each of said locations, each of said points being situated such that the condition of said points affects the state of a respective location.

8. The register according to claim 7 including means coupled to said points for causing the states of said locations not already inverted by interference to invert when the state of any of said locations inverts from interference.

9. The register according to claim 7 including a first structure associated with said points which is affected by said interference more than other structure associated with other points, said first structure initiating a change of state of said locations when affected beyond a predetermined threshold by said interference.

10. The register according to claim 1 wherein said inverting means automatically inverts the states of all of said locations to again define said original information.

11. The register according to claim 1 wherein said locations and the states thereof define elements of a code, said code representing information i when the states of said outputs define said original information and when the states of said outputs define said inverted information, whereby according to said code, the same meaning of information i is defined by the states of said outputs regardless of whether said states define original or inverted information.

12. The register according to claim 1 including means for detecting a discrete state of an extra location, said re-inverting means responsive to said detecting means to invert the states of all of said locations to again define said original information.

13. A register having one or more locations which may act as an output or outputs to define the information content of said register, said one or more locations representing n binary digit or digits, n being equal to one or more, each said location being capable of assuming each of two binary states, the construction of said register being such that when the binary state of any of said locations is inverted by interference, the binary states of all of said locations not already inverted by interference are inverted, said register being associated with means for automatically inverting all of said locations again after said inversion, whereby said binary states of said locations will then be as they were before said interference.

14. A method of making the information provided by a binary circuit tolerant to interference, the circuit having at least two outputs each of which may assume two binary states, said method comprising:
  interpreting the states of said outputs of said circuit to provide the same information for an original combination of states and for an inverted combination of states in which the states of corresponding output of said combinations are inverted, and not providing a different binary interpretation of the states of one of said combinations;
  when the state of at least one of said outputs is inverted by interference or a change is detected in said circuit resulting from said interference which may cause said at least one of said outputs to invert, inverting the binary states of all of said outputs not already inverted by interference from said original combination to said inverted combination, and inverting the binary states of all of said outputs again to revert to said original combination.

15. A binary coding system for processing, computing, or otherwise operating on or storing binary information comprising a plurality of binary circuits, each of said plurality of circuits including one more output than the number of outputs required to provide a desired information capacity interpreted according to conventional binary notation, all of said outputs being required to provide the desired information capacity, the binary states of said outputs being interpretable to provide the same information for an original combination of said states and for an inverted combination of said states in which the states of corresponding outputs are inverted digit for corresponding digit, wherein the system does not have different meanings for information combinations which are inverted from each other;

each of said plurality of binary circuits comprising at least one register having at least two outputs each of which may assume two binary states, given combinations of the states of said outputs providing given binary information, each of said plurality of circuits being capable of providing the same binary information meaning at its outputs regardless of inversions of states at any of said outputs caused by interference, each of said plurality of circuits comprising:

means for detecting an inversion of state in any of said outputs from interference or an unwanted changed in a respective circuit from interference capable of producing an inversion of state in any of said outputs;

means for inverting the states of all of said outputs not already inverted by interference from said original combination to said inverted combination when said inversion or said change is detected; and means for causing said inverted states to revert to said original states.

16. A register having two or more locations which may act as outputs to define the information content of said register, said locations representing n binary digits, n being equal to two or more, each of said locations being capable of assuming each of two binary states, said register including means responsive to an inversion of any of said locations by interference for causing the states of said locations not already inverted by interference to invert, the binary states of said locations before said interference defining original information of said register and the states of said locations after said interference defining inverted information of said register that is inverted digit for corresponding digit from said original information, said register including means for inhibiting said causing means during predetermined operations of said register.

* * * * *